United States Patent
Knies et al.

(10) Patent No.: US 10,122,033 B2
(45) Date of Patent: Nov. 6, 2018

(54) ASCERTAINING FUEL CELL INLET HUMIDITY BY MEANS OF PRESSURE SENSORS, AND A MASS FLOW RATE-DEPENDENT CONTROL OF THE HUMIDIFIER BYPASS

(71) Applicant: Robert Bosch GmbH, Stuttgart (DE)

(72) Inventors: David Knies, Pleidelsheim (DE); Daniel Zirkel, Wiernsheim-Serres (DE)

(73) Assignee: Robert Bosch GmbH, Stuttgart (DE)

( * ) Notice: Subject to any disclaimer, the term of this patent is extended or adjusted under 35 U.S.C. 154(b) by 94 days.

(21) Appl. No.: 14/435,336

(22) PCT Filed: Oct. 7, 2013

(86) PCT No.: PCT/EP2013/070757
§ 371 (c)(1),
(2) Date: Apr. 13, 2015

(87) PCT Pub. No.: WO2014/056811
PCT Pub. Date: Apr. 17, 2014

(65) Prior Publication Data
US 2015/0295258 A1    Oct. 15, 2015

(30) Foreign Application Priority Data
Oct. 12, 2012   (DE) .................. 10 2012 218 636

(51) Int. Cl.
*H01M 8/04492* (2016.01)
*H01M 8/04828* (2016.01)
(Continued)

(52) U.S. Cl.
CPC ..... *H01M 8/04492* (2013.01); *H01M 8/0438* (2013.01); *H01M 8/04126* (2013.01);
(Continued)

(58) Field of Classification Search
None
See application file for complete search history.

(56) References Cited

U.S. PATENT DOCUMENTS

| | | | |
|---|---|---|---|
| 2002/0009623 A1 | 1/2002 | St-Pierre et al. | |
| 2007/0141412 A1* | 6/2007 | Becker | H01M 8/04141 429/414 |

(Continued)

FOREIGN PATENT DOCUMENTS

| | | |
|---|---|---|
| DE | 19918850 | 11/2000 |
| WO | 2008034253 | 3/2008 |

OTHER PUBLICATIONS

International Search Report for Application No. PCT/EP2013/070757 dated Dec. 20, 2013 (English Translation, 2 pages).

*Primary Examiner* — Lucas J. O'Donnell
(74) *Attorney, Agent, or Firm* — Michael Best & Friedrich LLP

(57) ABSTRACT

The invention relates to a fuel cell arrangement (1) having at least one fuel cell (2) with a cathode (3) and an anode. The cathode (3) and the anode each have a reactant feed (4) and a reactant discharge (5), a humidifying device (10) and sensors (12, 13, 14) being provided at least at one of the reactant feeds (4). In particular, the sensors (12, 13, 14) are at least one fluid mass sensor (12) and two pressure sensors (13, 14), the fluid mass sensor (12) and one of the pressure sensors (13) being arranged upstream of the humidifying device (10) and one of the pressure sensors (14) being arranged downstream of the humidifying device (10). The humidifying device (10) can be operated in a controlled manner on the basis of the measurements of the sensors (12, 13, 14). The invention further relates to a method for controlling the humidity of a reactant for such a fuel cell arrangement (1).

9 Claims, 1 Drawing Sheet

(51) Int. Cl.
  *H01M 8/04119*   (2016.01)
  *H01M 8/0438*    (2016.01)
  *H01M 8/04537*   (2016.01)
  *H01M 8/04746*   (2016.01)

(52) U.S. Cl.
  CPC ... *H01M 8/04141* (2013.01); *H01M 8/04149* (2013.01); *H01M 8/04544* (2013.01); *H01M 8/04746* (2013.01); *H01M 8/04835* (2013.01)

(56) References Cited

U.S. PATENT DOCUMENTS

| | | | |
|---|---|---|---|
| 2008/0152961 A1* | 6/2008 | Zhou | H01M 8/04231 429/413 |
| 2008/0206608 A1 | 8/2008 | Lienkamp et al. | |
| 2008/0311438 A1 | 12/2008 | Rutkowski et al. | |

* cited by examiner

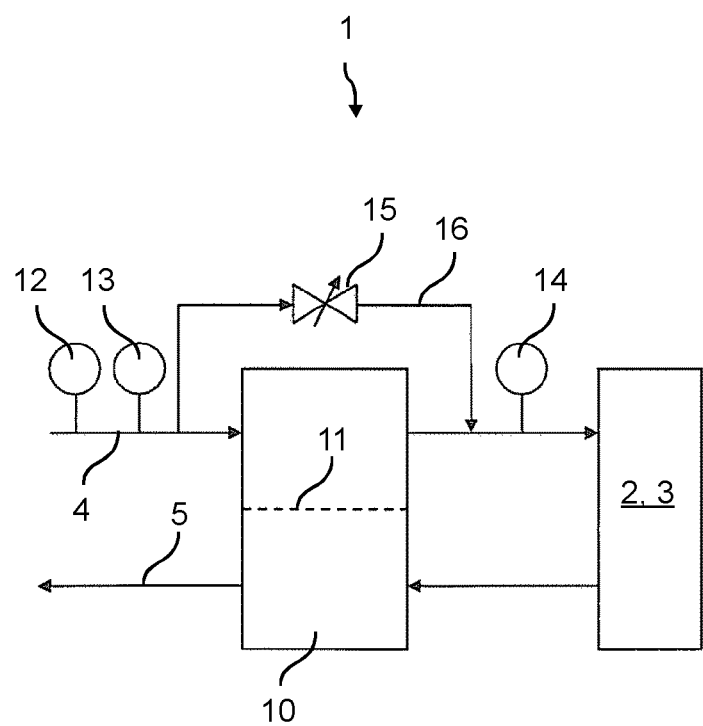

ASCERTAINING FUEL CELL INLET HUMIDITY BY MEANS OF PRESSURE SENSORS, AND A MASS FLOW RATE-DEPENDENT CONTROL OF THE HUMIDIFIER BYPASS

BACKGROUND OF THE INVENTION

The present invention relates to a fuel cell arrangement as well as to a method for controlling the humidity of a reactant for a fuel cell arrangement.

Fuel cells, in particular fuel cells driven with pure hydrogen, are considered today to be the powertrain of the future due to the fact that they emit only pure water. Such fuel cells have, in particular, a fuel cell membrane which also requires water in the form of steam. The steam is used thereby to ensure a sufficiently high ionic conductivity within the fuel cell through the membrane.

In the case of known fuel cell arrangements, this steam can be fed into the fuel cells that comprise at least one of the two reactants, which react with one another in the fuel cell. In order to assure an optimal operation of the fuel cell arrangement, it is necessary to monitor and in particular to control or adjust this humidity. An open-loop or closed-loop control arrangement is thus known, for example, from the German patent publication DE 10 2008 020 102 A1 for the open-loop control or closed-loop control of the water volume of at least one of the reactants supplied to the fuel cells. Provision is thereby made for a dew point measurement sensor and a temperature sensor, which are used to determine the humidity of the at least one reactant. A dew point measurement sensor can be designed in a known manner as a semiconductor sensor and is thus, like other humidity sensors, susceptible to interference if drops form in the reactant. An accumulation of liquid water can particularly lead to errant measurements.

The WIPO patent publication WO 2008/034253 likewise discloses a control system for the humidity of a reactant in a fuel cell arrangement. In this case, a pressure and a temperature sensor are used in order to determine the humidity of the reactant by means of a complicated calculation. It is furthermore necessary for this calculation to include the mass flow of the reactant and the mass flow of water supplied by a humidifying device in the calculation. In so doing, this calculation is also susceptible to faults due to the plurality of input parameters, in particular if only one of the sensors breaks down or malfunctions.

SUMMARY OF THE INVENTION

It is therefore the aim of the present invention to at least partially rectify the disadvantages of known fuel cell arrangements that have been described above. It is particularly the aim of the present invention to provide a fuel cell arrangement as well as a method for controlling the humidity of a reactant for a fuel cell arrangement, in which as few physical variables as possible are used to determine the humidity of the reactant and which variables can furthermore be simply and cost effectively acquired using measurement techniques.

The aim mentioned above is met by the fuel cell arrangement and the method of the invention. In so doing, the features and details which are described in connection with the fuel cell arrangement according to the invention, also, of course, apply in connection with the method according to the invention and in each case vice versa, so that reference is or can always be made reciprocally between said inventive cell arrangement and said inventive method with respect to the disclosure of the individual aspects of the invention.

In a first aspect of the invention, a fuel cell arrangement comprises at least one fuel cell with a cathode and an anode. The cathode and the anode each have a reactant feed and a reactant discharge, a humidifying device and sensors being provided at least at one of the reactant feeds. In particular, a fuel cell arrangement according to the invention is characterized in that the sensors are at least one fluid mass sensor and two pressure sensors, the fluid mass sensor and one of the pressure sensors being arranged upstream of the humidifying device and one of the pressure sensors being arranged downstream of the humidifying device. The humidifying device can be operated in a controlled manner on the basis of the measurements of the sensors.

A fuel cell which can be used in a fuel cell arrangement according to the invention, can particularly be a fuel cell that is operated with pure hydrogen. The fluids used as reactants are in this case preferably pure hydrogen and air. The sensors provided in a fuel cell arrangement according to the invention are simple and known sensors for the physical variables of mass flow rate and pressure. In particular for an automotive application of a fuel cell arrangement according to the invention, additional, new sensors do not therefore have to be developed, whereby development costs can be saved.

The quantity of the reactant supplied per unit of time is determined by means of the fluid mass sensor. This reactant which can be configured as liquid, in particular as a gas, is humidified downstream of the fluid mass sensor by means of the humidifying device. The pressure of the reactant is measured both upstream and downstream of the humidifying device by the pressure sensors that are arranged upstream and downstream of said humidifying device. The humidity added to the reactant in the humidifying device can be inferred from a resulting pressure difference which can be calculated from the two pressure measurements in conjunction with the likewise determined mass flow rate. It is therefore possible to reliably infer the humidity in the reactant on the basis of these measurements. The use of only one of the fluid mass sensors and two pressure sensors thus constitutes a particularly simple, robust and moreover cost effective manner of determining the humidity of a reactant.

According to the invention, provision is made on the basis of this humidity measurement for the humidifying device to be operated in a controlled manner. It is thus possible to also directly adjust or control the humidity by means of the control of the humidifying device. An operation of the fuel cell arrangement with an optimal humidity can thus be ensured.

Provision can preferably made in a fuel cell arrangement according to the invention for the sensors and the humidifying device to be arranged in the reactant feed of the cathode. The cathode of a fuel cell arrangement according to the invention can particularly be operated with air as a reactant. In this manner, it is thus possible to implement a humidification, in particular, exclusively of the reactant's air. This is sufficient for the operation of a fuel cell arrangement according to the invention because the humidity can also diffuse to the anode side by means of the membrane present in the fuel cell. A humidification only on one side, in particular on the cathode side, is therefore advantageous because only one reactant is or has to be humidified. Hence, this represents a particularly simple embodiment of a fuel cell arrangement according to the invention which can be more robust and consequently less susceptible to malfunctioning.

Provision can furthermore be made in a fuel cell arrangement according to the invention for a bypass line which is controlled by a valve to be provided in the at least one reactant feed, via which bypass line the humidifying device can be completely and/or partially bypassed. Dry reactant, in particular, e.g., dry air, is guided past the humidifying device by means of the bypass line. Downstream of the humidifying device, this dry reactant portion is again brought together with the reactant portion humidified in the humidifying device. The mixture of the two reactant portions is subsequently supplied to the fuel cell of the fuel cell arrangement. The ratio of dry to humidified reactant portion yields the total moisture content in the reactant. In order to change or control the total moisture content, only the valve has thus to be actuated which controls the flow of the reactant portion through the bypass line. A particularly simple control and adjustment of the total moisture content of the reactant supplied to the fuel cell is therefore possible.

Provision can furthermore be made in a fuel cell arrangement according to the invention for the humidifying device to be a gas-gas humidifier. Such a gas-gas humidifier has a membrane which is impermeable to air but permeable to water. The partial pressure difference of the steam between the two sides of the membrane forms the driving force for humidification in a gas-gas humidifier. If a dry reactant is fed through the one side of the gas-gas humidifier, water then diffuses through the membrane and humidifies said reactant. Because particularly a gas-gas humidifier is thus constructed without pumps or other mechanical parts, a gas-gas humidifier constitutes a particularly simple and robust humidifying device.

According to a particularly preferred modification to a fuel cell arrangement according to the invention, provision can be made for the gas-gas humidifier to also be connected to the corresponding reactant discharge of the fuel cell. Water results as a reaction product in the fuel cell, in particular in a fuel cell operated with pure hydrogen. Said water is discharged via the reactant discharge out of the fuel cell. By means of the connection of the gas-gas humidifier to the reactant discharge, said water produced in the fuel cell can thus be recycled for the humidification of the reactant in the reactant feed. The need for an external water supply for such a gas-gas humidifier can consequently be precluded or at least reduced. An autonomous operation of a fuel cell arrangement according to the invention is also thereby conceivable.

According to a second aspect of the invention, the aim is met by a method for controlling the humidity of a reactant for a fuel cell arrangement, the fuel cell arrangement being equipped in accordance with the first aspect of the invention. In particular, a method according to the invention is characterized in that the humidity of the reactant in the at least one reactant feed is, in particular approximately, calculated on the basis of the measured values of the sensors. All of the advantages, which have been described with respect to a fuel cell arrangement according to the first aspect of the invention, therefore also apply to a method according to the invention, by means of which such a fuel cell arrangement is operated.

The mass flow or pressure sensors used in the method are simple sensors which are already available, in particular for an application in an automobile. Expensive new developments can thereby be avoided. In particular, the use of humidity sensors, which are highly susceptible to malfunctioning especially if liquid water is present, can likewise be avoided by means of the method according to the invention. An inventive method for controlling the humidity of the reactant for a fuel cell arrangement therefore constitutes a particularly simple, robust and cost effective method for controlling the humidity of the reactant for a fuel cell arrangement.

An inventive method for controlling the humidity of a reactant for a fuel cell arrangement can furthermore be designed in such a way that the calculated humidity is linearly dependent on a measured fluid mass flow rate and linearly dependent on a difference between the measured pressures. A linear dependence of the humidity on measured variables constitutes a particularly simple dependence and is therefore simple to calculate. This particularly impacts the speed with which such a calculation can be performed. The calculated humidity can thereby especially be calculated with, e.g., an accuracy of +/−20%. This accuracy is sufficient for an optimal operation of the fuel cell arrangement. A further advantage of a linear dependence of the calculated humidity is provided by the fact that the calculation can also be carried out in an analog circuit. As a result, complicated, elaborate and therefore costly digital electronics for calculating the humidity in the reactant are not necessary.

In addition, provision can be made in an inventive method for controlling the humidity of a reactant for a fuel cell arrangement for a bypass line to be provided in the at least one reactant feed. By means of the bypass line, the humidifying device is entirely and/or partially bypassed and said bypass line is controlled by a valve, which is controlled on the basis of the measured fluid mass flow rate and the measured pressures. The flow rate through the bypass line is controlled by the valve. The portion of the reactant which flows through the bypass line is therefore, in contrast to the portion of the reactant which flows through the humidifying device, not humidified in said humidifying device. The two reactant portions are again brought together downstream of said humidifying device, a total moisture content thereby resulting in the reactant. This total moisture content in the reactant can be calculated by means of the method according to the invention, in particular approximately, from the measured fluid mass flow rate and the measured pressures. On the basis of this calculation, a control of the valve is also possible such that an ideal moisture content in the reactant can be achieved for an optimal operation of the fuel cell arrangement. For this reason, the control of the valve like the calculation of the moisture content in the reactant is particularly simple and robust.

In addition, an inventive method for controlling the humidity of a reactant for a fuel cell arrangement can be configured to the effect that the valve is controlled via a control voltage and that the control voltage is only calculated from the measured fluid mass flow rate. The relative measure of the humidity of a quantity of reactant flowing through the humidifying device is independent from this quantity. For this reason, a higher flow through the bypass line is also required when the mass flow rate of the reactant in the reactant feed is higher in order to keep the total moisture content of the reactant constant upon entering the fuel cell. A control of the valve that is solely dependent on the fluid mass flow rate can therefore be sufficient to ensure a constant humidification of the reactant flowing into the fuel cell. By being dependent on only one input variable, such a control is especially simple and robust against the effects of other state variables of the fuel cell arrangement.

In a particularly preferred manner, provision can be made in a modification to an inventive method for controlling the humidity of a reactant for a fuel cell arrangement for the control voltage to be calculated from the fluid mass flow rate in a linearly dependent manner. A linear dependence constitutes in turn a particularly simple dependence which can be especially quickly calculated. In this instance, it is conceivable to carry out the calculation with purely analog electronics, whereby complicated digital electronics can again be avoided. In a particularly advantageous manner, the accuracy of the resulting moisture content in the reactant which can be achieved can be within +/−10%. This accuracy is sufficient for an optimal operation of a fuel cell arrangement according to the invention. In this way, a particularly simple, robust and cost effective option is therefore provided in order to control the humidity of a reactant for a fuel cell arrangement.

BRIEF DESCRIPTION OF THE DRAWINGS

The fuel cell arrangement according to the invention and the modifications thereto as well as the advantages thereof and the method according to the invention and the modifications thereto as well as the advantages thereof are subsequently explained in detail with the aid of a drawing. In the drawing:

FIG. 1 shows schematically a fuel cell arrangement according to the invention.

DETAILED DESCRIPTION

A portion of a fuel cell arrangement 1 according to the invention is schematically depicted in FIG. 1. The fuel cell arrangement has a fuel cell 2, of which only the cathode 3 is depicted. The cathode 3 is thereby connected to a reactant feed 4 and a reactant discharge 5. Air is used as the reactant for the cathode 3 in the exemplary embodiment shown. Of course, other fluids, such as, for example, pure oxygen, are also conceivable as the reactant. A fluid mass sensor 12 is situated in the reactant feed 4. The mass per unit of time of the air supplied in the reactant feed 4 of the fuel cell 2 is measured by the fluid mass sensor 12. A humidifying device 10 is furthermore disposed in the reactant feed 4. Said humidifying device is used to humidify the reactant, in particular the air, because at least one of the two reactants, in this case the air supplied to the cathode 3 of the fuel cell 2, has to have a certain humidity for an optimal operation of the fuel cell 2. The humidifying device 10 depicted is particularly designed as a gas-gas humidifier. The humidifying device 10 therefore has a membrane 11 which divides said humidifying device 10, in particular as shown schematically, into two sides. In the fuel cell 2, air reacts on the cathode side 3 with pure hydrogen on the anode side in the embodiment that is depicted. Water results thereby as a reaction product, said water being discharged in turn out of the fuel cell 2 by means of the reactant discharge 5. This water is supplied to one of the two sides of the humidifying device 10.

The air flowing in the reactant feed 4 has no or only a low humidity. This air is supplied to the second side of the humidifying device 10. The membrane 11, which is designed to be impermeable to air but permeable to water, therefore allows, driven by the partial pressure difference of the water on both sides of the membrane 11, a diffusion of the water from the side of the humidifying device 10 facing the reactant discharge 5 to the side of said humidifying device 10 facing the reactant feed 4. In so doing, a humidification of the reactant of the reactant feed 4 is possible in the humidifying device 10. An external water supply to the humidifying device 10 is not necessary. A pressure sensor 13, 14 is arranged in each case at the reactant feed 4 upstream or, respectively, downstream of the humidifying device 10. The pressure difference, which can be calculated from the measurements of the first pressure sensor 13 and the second pressure sensor 14, allows, together with the measurement of the fluid mass sensor 12, for a, in particular approximate, calculation of the humidity in the humidifying device 10 supplied to the reactant. The level of this humidity can thereby be relatively easily ascertained by means of a bilinear dependence of the measurements of all three sensors 12, 13, 14, in particular in each case linearly dependent on the mass flow rate and on the pressure difference.

In order to be able to implement a control of the humidity of the reactant, the inventive fuel cell arrangement in the embodiment depicted is equipped with a bypass line 16 which bypasses the humidifying device and can be controlled by a valve 15. Dry reactant, in particular dry air, can be guided past the humidifying device 10 via the bypass line 16. The ratio of dry air in the bypass line 16 and humidified air, which has passed through the humidifying device 10, yields the total moisture content of the reactant upon entry into the fuel cell 2. The valve 15 can thereby preferably be operated, in particular linearly, as a function of the measurement of the fluid mass sensor 12. As a result, a particularly simple control of the humidity of the reactant upon entering into the fuel cell 2 is made possible.

Because all of the components, in particular the fluid mass sensor 12 and the pressure sensors 13, 14 are also already in place for an application in the automotive field, such a fuel cell arrangement 1 according to the invention constitutes a particularly simple, robust and cost effective option for ensuring an optimal operation of a fuel cell arrangement 1 according to the invention with optimal humidification of the reactant.

What is claimed is:

1. A fuel cell arrangement (1) comprising at least one fuel cell (2) with a cathode (3) and an anode, wherein the cathode (3) and the anode each have a reactant feed (4) and a reactant discharge (5), a humidifying device (10) and sensors (12, 13, 14) being provided at least at one of the reactant feeds (4), characterized in that the sensors (12, 13, 14) are at least one fluid mass sensor (12) and two pressure sensors (13, 14), the fluid mass sensor (12) and one of the pressure sensors (13) being arranged upstream of the humidifying device (10) and one of the pressure sensors (14) being arranged downstream of the humidifying device (10), and in that the humidifying device (10) is configured to be operated in a controlled manner on the basis of the measurements of the sensors (12, 13, 14), and wherein a bypass line (16) is provided in the at least one reactant feed (4), which bypass line is configured to be controlled by means of a valve (15) and by means of which bypass line the humidifying device (10) is configured to be at least partially bypassed, and further wherein the bypass line is connected to the reactant feed at a point downstream of the humidifying device and upstream of the one of the pressure sensors being arranged downstream of the humidifying device, wherein a control circuit programmed to calculate humidity as linearly dependent on a measured fluid mass flow rate and linearly dependent on a difference between measured pressures is configured to determine the humidity of the reactant in the at least one of the reactant feeds on the basis of measurement values from no sensors other than the fluid mass sensor and the two pressure sensors.

2. The fuel cell arrangement (1) according to claim 1, characterized in that the sensors (12, 13, 14) and the humidifying device (10) are arranged in the reactant feed (4) of the cathode (3).

3. The fuel cell arrangement (1) according to claim 1, characterized in that the humidifying device (10) is a gas-gas humidifier.

4. The fuel cell arrangement (1) according to claim 3, characterized in that the gas-gas humidifier is also connected to a corresponding reactant discharge (5) of the fuel cell (2).

5. A method for controlling the humidity at a reactant for a fuel cell arrangement (1), the fuel cell arrangement (1) being configured according to claim 1, the method comprising calculating the humidity of the reactant in the at least one reactant feed (4) on the basis of measurement values of the sensors (12, 13, 14), characterized in that the calculated humidity is calculated linearly dependent on a measured fluid mass flow rate and linearly dependent on a difference between measured pressures.

6. The method for controlling the humidity of a reactant for a fuel cell arrangement (1) according to claim 5, characterized in that a bypass line (16) is provided in the at least one reactant feed (4), wherein the humidifying device (10) is at least partially bypassed by means of the bypass line (16) and said bypass line is controlled by means of a valve (15), the valve (15) being controlled on the basis of the measured fluid mass flow rate and the measured pressures.

7. The method for controlling the humidity of a reactant for a fuel cell arrangement (1) according to claim 6, characterized in that the valve (15) is controlled by means of a control voltage and in that the control voltage is calculated only from the measured fluid mass flow rate.

8. The method for controlling the humidity of a reactant for a fuel cell arrangement (1) according to claim 7, characterized in that the control voltage is calculated linearly dependent on the measured fluid mass flow rate.

9. The method for controlling the humidity of a reactant for a fuel cell arrangement (1) according to claim 5, wherein the humidity of the reactant in the at least one reactant feed (4) is approximately calculated on the basis of the measurement values of the sensors (12, 13, 14).

* * * * *